United States Patent
Balasubramanian et al.

(10) Patent No.: US 12,079,665 B2
(45) Date of Patent: Sep. 3, 2024

(54) APPLICATION NEGOTIABLE RESOURCE DIRECTOR TECHNOLOGY FOR EFFICIENT PLATFORM RESOURCE MANAGEMENT

(71) Applicant: Intel Corporation, Santa Clara, CA (US)

(72) Inventors: Kaushik Balasubramanian, Portland, OR (US); Rajesh Poornachandran, Hillsboro, OR (US); Karan Puttannaiah, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 841 days.

(21) Appl. No.: 17/023,161

(22) Filed: Sep. 16, 2020

(65) Prior Publication Data

US 2021/0004276 A1    Jan. 7, 2021

(51) Int. Cl.
  *G06F 9/50*     (2006.01)
  *G06F 21/51*    (2013.01)

(52) U.S. Cl.
  CPC .......... *G06F 9/5077* (2013.01); *G06F 9/5038* (2013.01); *G06F 9/5055* (2013.01); *G06F 21/51* (2013.01)

(58) Field of Classification Search
  CPC .............................................. G06F 9/50–5088
  See application file for complete search history.

(56) References Cited

U.S. PATENT DOCUMENTS

| | | | |
|---|---|---|---|
| 8,321,558 B1 | 11/2012 | Sirota et al. | |
| 10,686,718 B1* | 6/2020 | Wertheimer | ............ H04L 67/60 |
| 2002/0082856 A1* | 6/2002 | Gray | .......................... G06F 9/50 |
| | | | 718/104 |
| 2007/0127527 A1* | 6/2007 | Dan | ........................ G06Q 10/02 |
| | | | 370/477 |
| 2009/0119673 A1* | 5/2009 | Bubba | ........................ G06F 9/50 |
| | | | 713/300 |
| 2013/0304903 A1* | 11/2013 | Mick | .......................... G06F 9/44 |
| | | | 709/224 |
| 2014/0344440 A1 | 11/2014 | Dutta et al. | |
| 2015/0046279 A1 | 2/2015 | Wang | |
| 2019/0042739 A1* | 2/2019 | Browne | ................. G06F 21/554 |
| 2020/0137163 A1* | 4/2020 | Baghsorkhi | .............. H04L 47/82 |
| 2020/0334088 A1* | 10/2020 | Casillas | ................. G06F 9/5077 |

OTHER PUBLICATIONS

Partial Utility-Driven Scheduling for Flexible SLA and Pricing Arbitration in Clouds Jose Sim-ao and Luis Veiga (Year: 2016).*

(Continued)

*Primary Examiner* — Emerson C Puente
*Assistant Examiner* — Paul V Mills
(74) *Attorney, Agent, or Firm* — Jordan IP Law, LLC

(57) ABSTRACT

Systems, apparatuses and methods may provide for technology that automatically determines a first proposed change to an existing resource allocation associated with a first application in a first node, wherein the first proposed change is determined at least partially based on a requested resource allocation associated with a pending application and a first tolerance associated with the first application. The technology may also issue the first proposed change to the first application and automatically conduct the first proposed change if the first application accepts the first proposed change.

17 Claims, 11 Drawing Sheets

(56) References Cited

OTHER PUBLICATIONS

SLA and Profit-aware SaaS Provisioning through Proactive Renegotiation Aya Omezzine, Narjes Saoud, Said Tazi and Gene Cooperman (Year: 2016).*
Defining and guaranteeing dynamic service levels in clouds Rafael Brundo Uriarte, Rocco De Nicola, Vincenzo Scoca, Francesco Tiezzi (Year: 2019).*
A SLA-Based Resource Donation Mechanism for Service Hosting Utility Center Yufeng Wang, Huaimin Wang, Yan Jia, Dianxi Shi, and Bixin Liu (Year: 2005).*
Decreasing Impact of SLA Violations: A Proactive Resource Allocation Approach for Cloud Computing Environments Hossein Morshedlou and Mohammad Reza Meybodi (Year: 2014).*
Auction based Resource Allocation Strategy for Infrastructure as a service Anita Kumari and Sushma Jain (Year: 2016).*
European Search Report for EPO Patent Application No. EP 21183683.8, mailed Jan. 5, 2022, 10 Pages.

* cited by examiner

APPLICATION NEGOTIABLE RESOURCE DIRECTOR TECHNOLOGY FOR EFFICIENT PLATFORM RESOURCE MANAGEMENT

TECHNICAL FIELD

Embodiments generally relate to computing platform resource management. More particularly, embodiments relate to application negotiable resource director technology (RDT) for efficient platform resource management.

BACKGROUND

Cloud service providers typically deploy server systems to run multiple tenant applications or virtual machine (VM) instances (e.g., "tenants"), where each of the tenants may contest for shared resources such as cache, memory bandwidth, etc. Moreover, "noisy neighbor" conditions may exist when the performance of a given tenant is negatively impacted by a neighboring tenant. Conventional solutions to achieving fairness in resource sharing may lack scalability and result in lower fleet-level utilization. Accordingly, suboptimal performance may be experienced that may result in Service Level Agreement (SLA) violations for one or many tenants.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
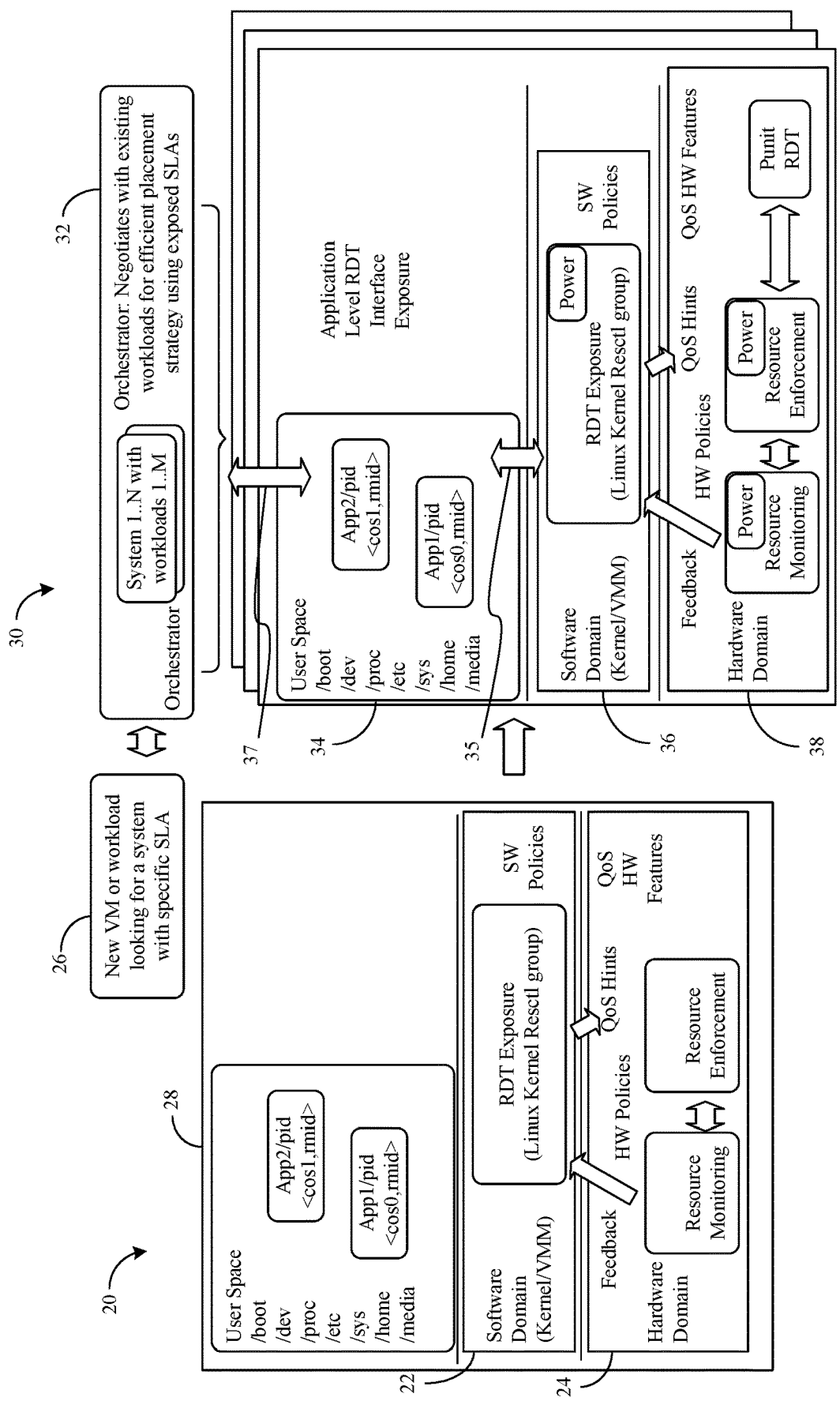
FIG. 1 is a block diagram of an example of a comparison between a conventional computing architecture and a computing architecture according to an embodiment.

Turning now to FIG. 1, a conventional computing architecture 20 is shown in which static resource allocation is used. In the illustrated example, class of service (CLoS) and resource management identifier (RMID) settings are provisioned statically and offline (e.g., prior to runtime) in a software domain 22 by an operating system (OS, e.g., kernel) or virtual machine monitor (VMM, e.g., hypervisor). The provisioned settings may be exposed to a hardware domain 24 via RDT or speed select technology (SST), where the hardware domain 24 also configures resource management offline. Thus, the illustrated resource provisioning is based solely on prior awareness of system requirements for respective applications and without the involvement of a user space 28.

If an incoming tenant 26 (e.g., new VM, application instance, workload, etc.) is unknown or requires an alternate resource configuration (e.g., service level agreement/SLA) at runtime, there may be no effective solution to facilitate the addition of the incoming tenant 26 to the conventional computing architecture 20. For example, CLoS is determined on a pre-deployment timeframe at a single-node scope in the architecture 20. Such an approach may not be scalable for hyperscale datacenters, where resource management occurs in a "scale-up" (e.g., node-to-datacenter) and "scale-out" (e.g., datacenter-to-cluster) manner. Moreover, with the static pre-allocation of resources, a public cloud requirement of dynamicity may result in lower fleet-level utilization.

By contrast, an enhanced computing architecture 30 uses an application negotiable RDT (AnRDT) approach where applications may dynamically negotiate resource allocation based on tolerance factors (e.g., "hints") prescribed by the existing applications and the incoming tenant 26 to achieve node level and cluster level optimization. More particularly, the illustrated architecture 30 exposes the RDT settings (e.g., SLAs) from a software domain 36 to a user space 34 via a bi-directional interface 35 and uses an orchestrator 32 to negotiate with existing workloads via a bi-directional interface 37 for efficient placement strategies using the exposed SLAs. A hardware domain 38 may provide runtime information such as, for example, power information (e.g., obtained from a power unit/Punit RDT) to the software domain 36, which in turn dynamically updates the RDT settings that are exposed to the user space 34.

With the proposed AnRDT, applications can dynamically negotiate resource allocation based on tolerance factors prescribed by the applications. Such an approach helps achieve effective colocation and improved fleet-level utilization at the cluster level with acceptable/guaranteed performance for all of the tenants (e.g., resulting in overall total cost of ownership/TCO benefits at the datacenter level). The enhanced computing architecture 30 also makes system resource allocation more scalable for hyperscale datacenters, where resource management occurs in a scale-up and scale-out manner (e.g., from single-node to a cluster of rack at a datacenter level). Furthermore, the architecture 30 may effectively handle tenants having alternate resource requirements at runtime (e.g., dynamically), which is prevalent in public cloud environments. Accordingly, higher fleet level utilization may be achieved, which leads to enhanced performance.

Figure 2:
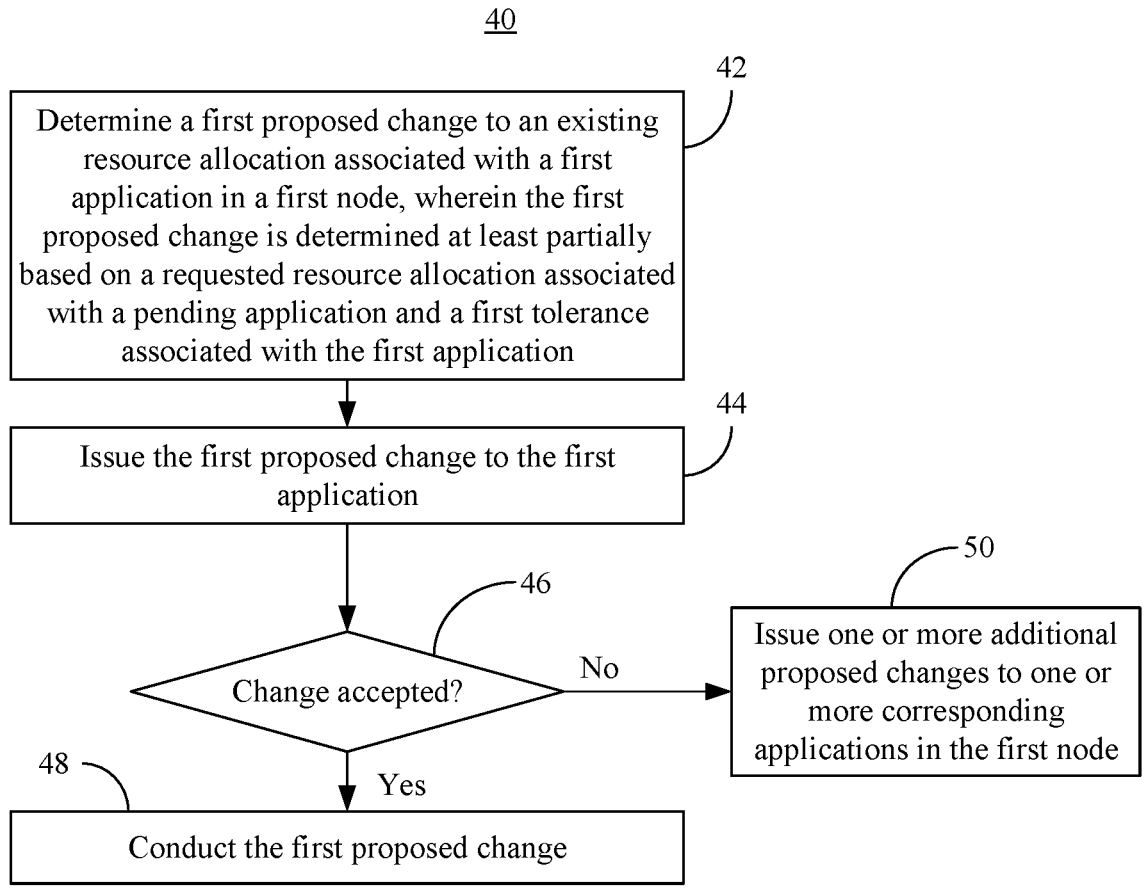
FIG. 2 is a flowchart of an example of a method of operating a performance-enhanced computing system according to an embodiment.

FIG. 2 shows a method 40 of operating a performance-enhanced computing system. The method 40 may generally be implemented in an orchestrator such as, for example, the orchestrator 32 (FIG. 1), already discussed. More particularly, the method 40 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 40 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 42 provides for automatically determining a first proposed change to an existing resource allocation associated with a first application (e.g., existing workload, instance, VM, tenant, etc.) in a first node (e.g., of a server rack). In the illustrated example, the first proposed change is determined at least partially based on a requested resource allocation (e.g., SLA) associated with a pending application (e.g., incoming tenant) and a first tolerance associated with the first application. In an embodiment, the first tolerance includes a migration tolerance parameter (e.g., indicating a tolerance to application migration), a frequency tolerance parameter (e.g., operating frequency range, minimum and/or target), a memory bandwidth (BW) tolerance parameter (bandwidth, minimum and/or target), a cache size tolerance parameter (e.g., cache size range, minimum and/or target), a thermal design power (TDP) tolerance parameter (e.g., TDP range, minimum and/or target), an instructions per clock (IPC) tolerance parameter (e.g., IPC range, minimum and/or target), etc., or any combination thereof. Moreover, the first proposed change may include a reduction to the existing resource allocation and/or a migration of the first application to a second node. The decision to migrate an application across nodes may result in application tolerances (e.g., RDT settings) migrating along with the application.

Application Tolerance

Application tolerance may be a factor that is specified by the application and ranges from 0 to 1 (e.g., representing the application tolerance to a potential change in system resources and/or a consequent node migration). For example, the condition factor=0 may indicate that the application cannot tolerate any change in system resource while the condition the factor=1 may indicate that the application is flexible to any change to system resources.

In an embodiment, the application tolerance assigns a value to system resource requirements such as frequency range, memory BW range, cache size range, TDP range, migration tolerance, IPC range, accelerator configuration, reserved fields, and so forth. For example, a typical application tolerance might be: Struct SLA Template {Fmin, Ftarget, MemBWmin, MemBWdesired, CacheSizemin, CacheSizetarget, generational IPCmin, MigrationTolerance, IPC requirement, Accelerator Config, ReservedFields}.

Migration tolerance may indicate the application (e.g., instance/VM) tolerance to migrate to a different node due to resource constraints. In an embodiment, the migration includes halting processes in the application (typically on the milli-seconds scale) until a negotiation with a different node is successful. The optional field generational IPC range may indicate an IPC requirement (e.g., higher IPC for artificial intelligence/AI training and/or inference using instructions such as AX512_VNNI, AVX512_BF16, etc.). In one example, the optional field accelerator configuration indicates accelerator dependencies, such as graphics processing unit (GPU), inference neural processor, etc. Reserved fields may provide for additional system resource parameters for future scalability.

Block 44 issues (e.g., as part of a negotiation session) the first proposed change to the first application, where block 46 determines whether the first proposed change has been accepted by the first application. If so, illustrated block 48 conducts the first proposed change. In one example, block 46 determines (e.g., via a programmable whitelist manifest and a trusted entity such as a baseboard management controller/BMC or a trusted execution environment/TEE) whether the pending application and the first application are trusted. In such a case, if the pending application and/or the first application are determined to be untrusted, block 46 may override the proposed change and bypass block 48. Moreover, the trusted entity may take a configured policy-based action if the pending application and/or the first application are determined to be untrusted. Thus, the method 40 may provide an additional layer of protection against the pending application maliciously attempting to occupy system resources, the first application being corrupted into releasing necessary resources, and so forth. If it is determined at block 46 that the first application has not accepted the proposed change, block 50 may issue one or more additional proposed changes to one or more corresponding applications in the first node. In a bidding scenario, all proposed changes may be issued in parallel, as will be discussed in greater detail. If one of the additional proposed changes is accepted by a corresponding application (e.g., a winning bidder), the additional proposed change may be automatically conducted.

The illustrated method 40 enhances performance by using application tolerances to dynamically adapt to incoming tenants that are unknown or require alternate resource configurations (e.g., SLAs) at runtime. The ability to automatically adjust existing resource allocations when tolerable by the corresponding application results in a more scalable architecture. Moreover, negotiating with existing applications as shown further enhances flexibility, scalability and performance, particularly in dynamic conditions (e.g., changing power consumption conditions).

Figure 3A:
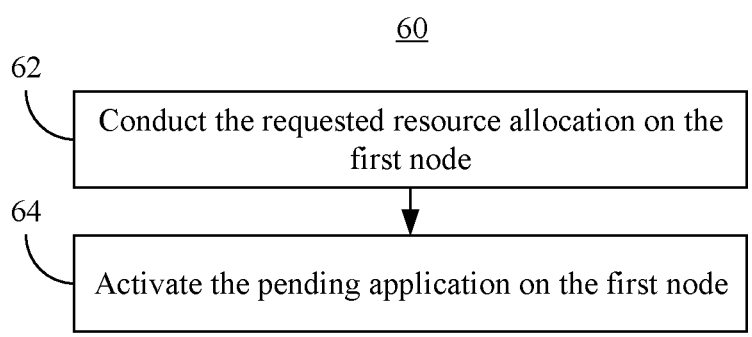
FIGS. 3A and 3B are flowcharts of examples of methods of conducting changes to existing resource allocations according to embodiments.

FIG. 3A shows a method 60 of conducting a proposed change that includes a reduction to an existing resource allocation (e.g., within a tolerable limit specified by the first application). The method 60 may generally be incorporated into block 48 (FIG. 2), already discussed. More particularly, the method 60 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 62 conducts the requested resource allocation (e.g., associated with the pending application) on the first node. In an embodiment, block 62 includes reducing a processor operating frequency, allocating a portion of the memory bandwidth to the pending application, allocating a portion of the cache to the pending application, and so forth. Additionally, block 64 may activate the pending application on the first node. The method 60 therefore further enhances performance by dynamically adjusting resource allocations.

Figure 3B:
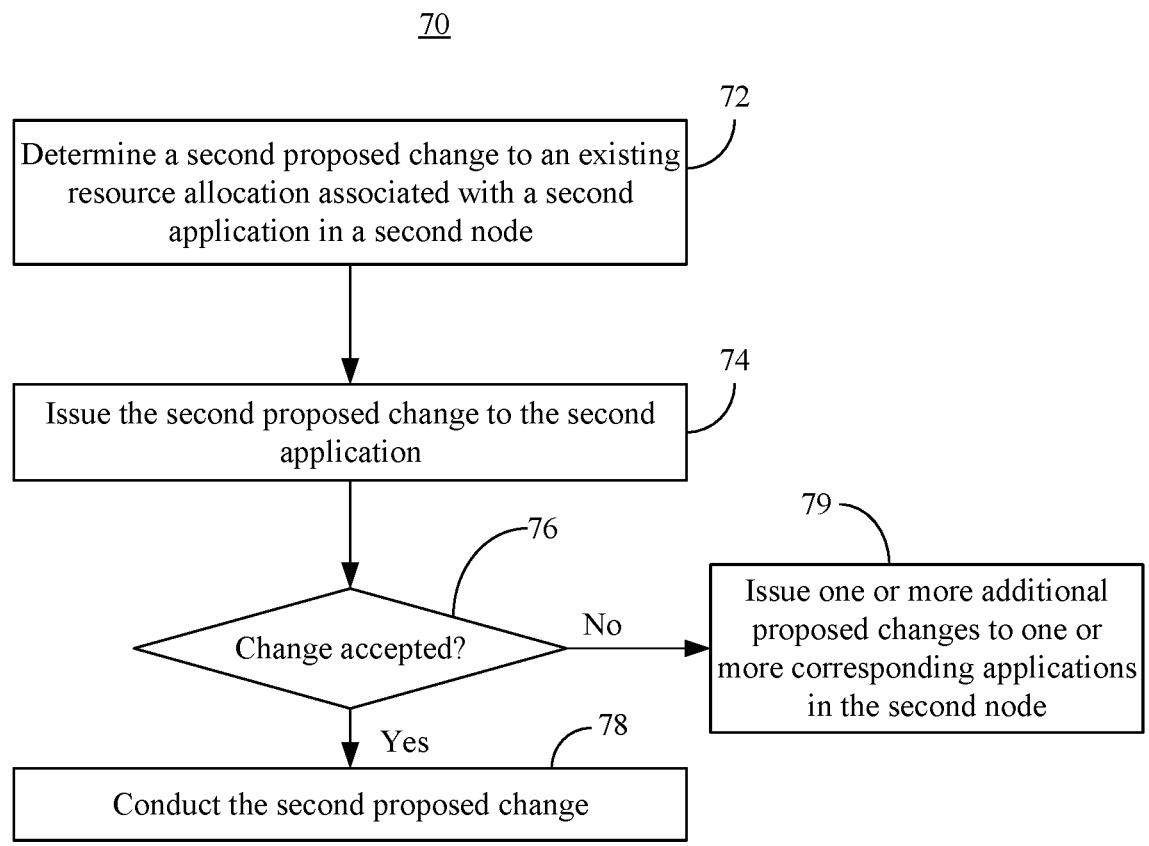

FIG. 3B shows a method 70 of conducting a proposed change that includes a migration of the first application to a second node (e.g., the first and second nodes may reside in the same or different racks, servers or datacenters). The method 70 may generally be incorporated into block 48 (FIG. 2), already discussed. More particularly, the method 70 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 72 determines a second proposed change to an existing resource allocation associated with a second application (e.g., existing workload, instance, VM, tenant, etc.) in the second node. In one example, the second proposed change is determined at least partially based on the existing resource allocation associated with the first application and a second tolerance associated with the second application. The second tolerance may include a migration tolerance parameter, a frequency tolerance parameter, a BW tolerance parameter, a cache size tolerance parameter, a TDP tolerance parameter, an IPC tolerance parameter, etc., or any combination thereof. In an embodiment, block 74 issues the second proposed change to the second application, where a determination is made at block 76 as to whether the second application has accepted the second proposed change. If so, block 78 conducts the second proposed change, which may include a reduction to the existing resource allocation of the second application and/or a migration of the second application to a third node. Block 76 may also override the second proposed change and bypass block 78 if untrusted code is detected. Illustrated block 79 issues one or more additional proposed changes to one or more corresponding applications in the second node if the second proposed change is not accepted by the second application. If one of the additional proposed changes is accepted by a corresponding application (e.g., a winning bidder), the additional proposed change may be automatically conducted.

Figure 4A:
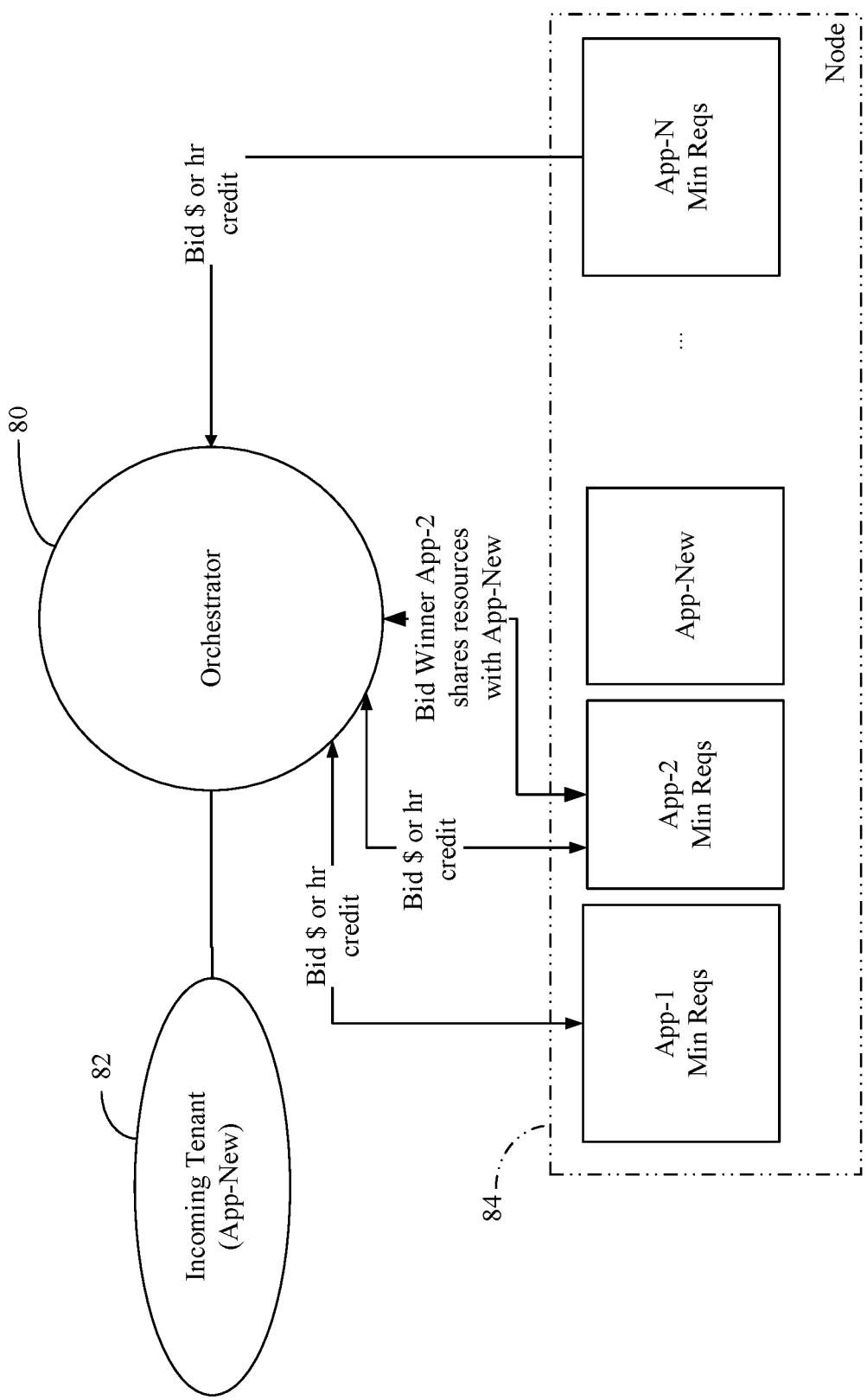
FIGS. 4A and 4B are block diagrams of examples of resource bidding scenarios according to embodiments.

FIG. 4A shows a resource bidding scenario in which an orchestrator 80 detects an incoming tenant 82 ("App-New"). In the illustrated example, a node 84 includes a plurality of existing applications ("App-1" to "App-N"), with each of the existing applications having minimum requirements (e.g., application tolerances and/or hints). In an embodiment, the orchestrator 80 notifies the existing applications of a proposed change in the resources allocated to the existing applications and the existing applications bid (e.g., in parallel) in terms of currency or time (e.g., hour credit) to accept the proposed change. In the illustrated example, the existing application App-2 wins the bid and shares resources with the incoming tenant 82, which is "spun-up" and joins the other existing applications on the node 84.

Figure 4B:
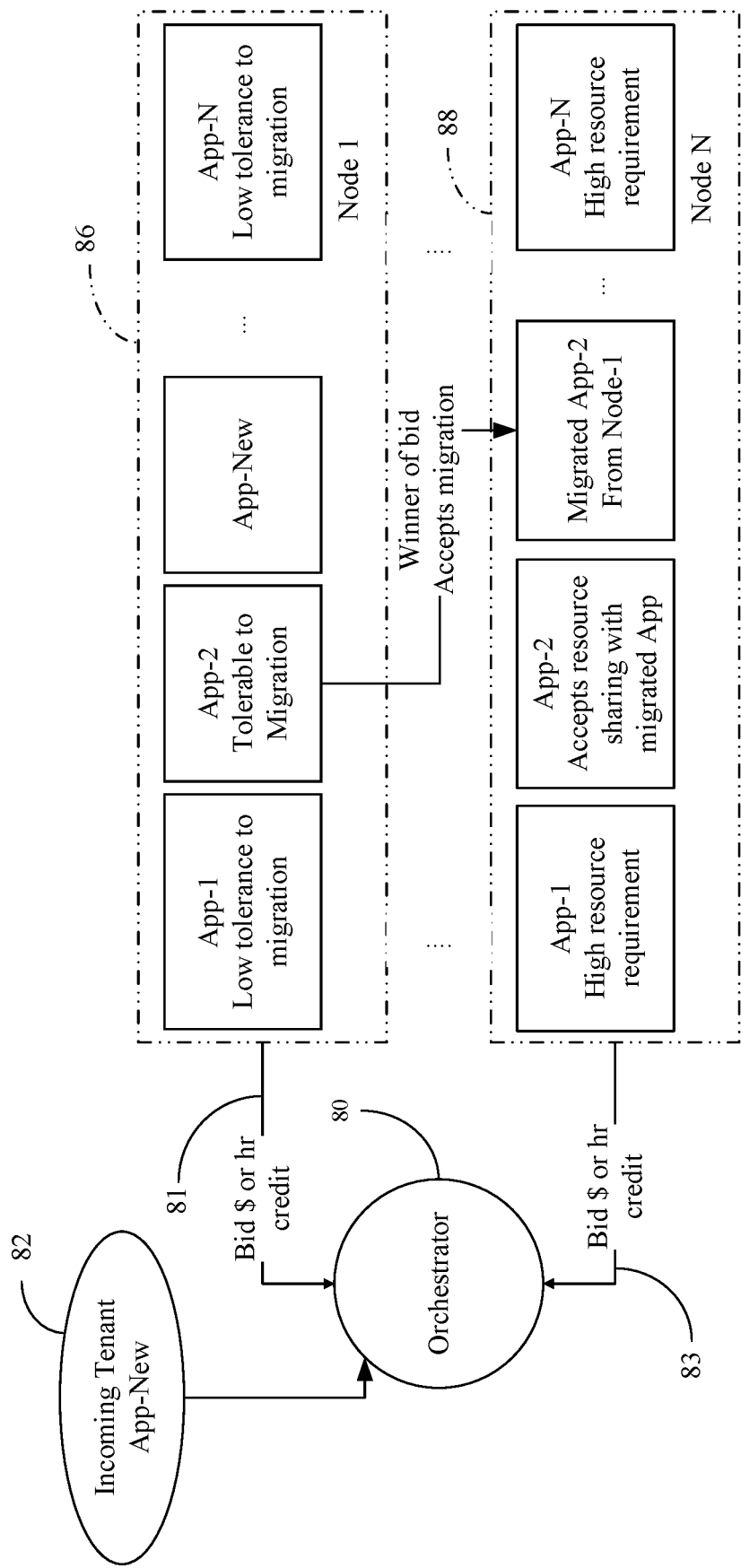

FIG. 4B shows another resource bidding scenario in which the orchestrator 80 detects the incoming tenant 82 ("App-New"). In the illustrated example, a first node 86 ("Node 1") includes a plurality of existing applications ("App-1" to "App-N"), where the existing applications App-1 and App-N have a low tolerance to migration and the existing application App-2 is relatively tolerable to migration. In an embodiment, the orchestrator 80 notifies the existing applications via a first bi-directional interface 81 of a proposed change in the resources allocated to the existing applications and the existing applications bid via the first bi-directional interface 81 in terms of currency or time (e.g., hour credit) to accept the proposed change. In the illustrated example, the existing application App-2 on the first node 86 wins the bid and is migrated to a second node 88 ("Node N") having a second bi-directional interface 83 with the orchestrator 80. The second node 88 might also include a plurality of existing applications ("App-1" to "App-N"), where the existing applications App-1 and App-N have a high resource requirement and the existing application App-2 is relatively tolerable to sharing resources. In such a case, the existing application App-2 on the second node 88 wins the bid and shares resources with the existing App-2 (e.g., incoming tenant) from the first node 86.

Figure 5:
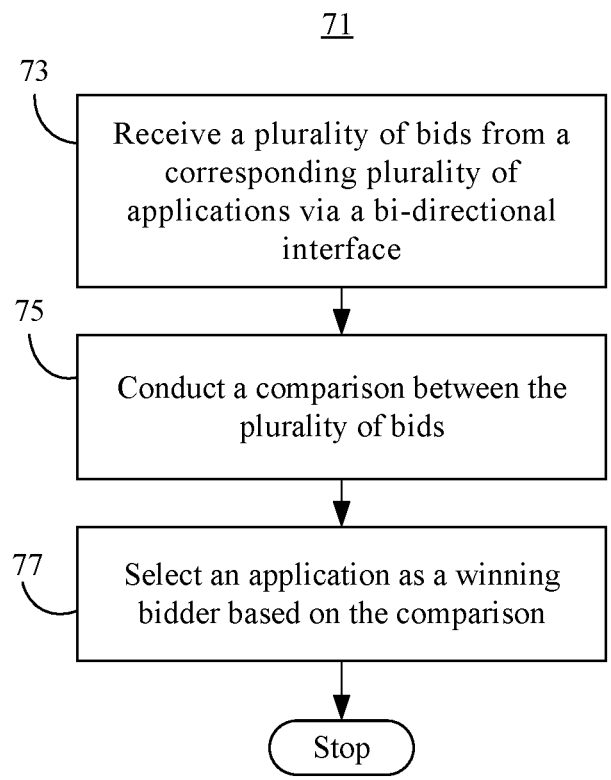
FIG. 5 is a flowchart of an example of a method of managing application bids according to an embodiment.

FIG. 5 shows a method 71 of managing application bids. The method 71 may generally be implemented in an orchestrator such as, for example, the orchestrator 32 (FIG. 1) and/or the orchestrator 80 (FIGS. 4A and 4B), already discussed. More particularly, the method 71 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 73 receives a plurality of bids from a corresponding plurality of applications via a bi-directional interface. In an embodiment, block 75 conducts a comparison between the plurality of bids (e.g., in terms of currency, time, credit, etc.), where block 77 selects an application as a winning bidder based on the comparison.

Figure 6:
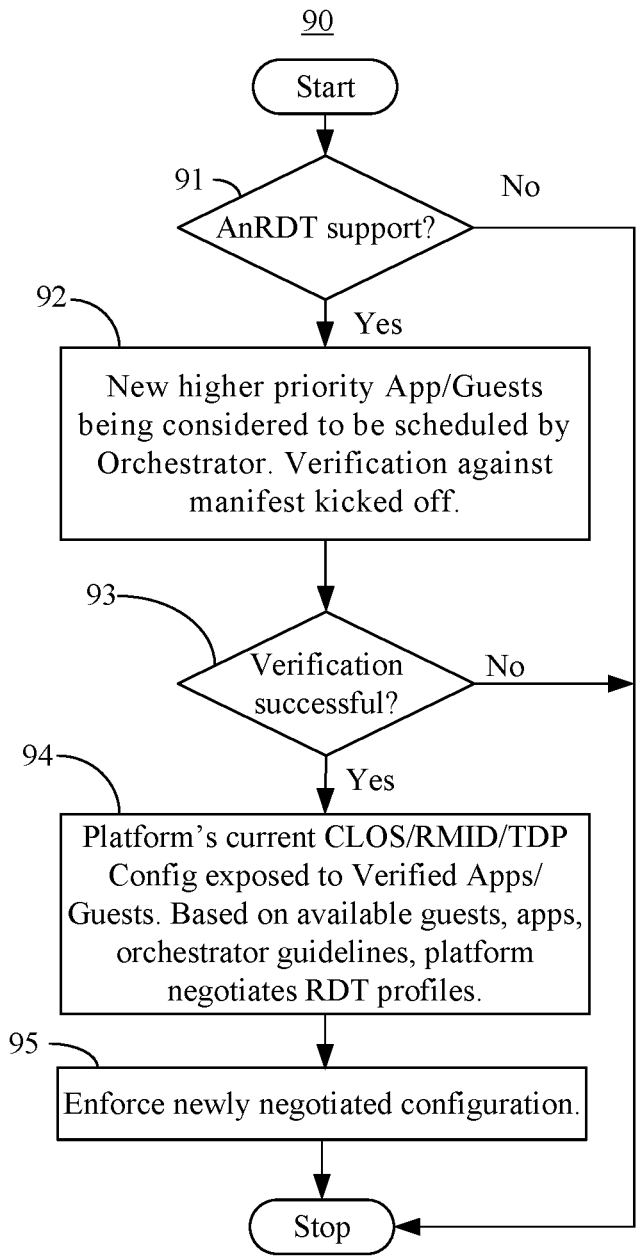
FIG. 6 is a flowchart of an example of a more detailed method of operating a performance-enhanced computing system according to an embodiment.

FIG. 6 shows a more detailed method 90 of operating a performance-enhanced computing system. The method 90 may generally be implemented by an orchestrator such as, for example, the orchestrator 32 (FIG. 1) and/or the orchestrator 80 (FIGS. 4A and 4B), already discussed. More particularly, the method 90 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 91 provides for determining whether AnRDT is supported. If not, the illustrated method 90 terminates. If AnRDT is supported, block 92 determines that a new higher priority application (App) and/or guest is being considered to be scheduled by the orchestrator. In such a case, a whitelist manifest verification is triggered (e.g., "kicked off"). Block 93 determines whether the verification was successful. If not, the illustrated method 90 terminates. Otherwise block 94 exposes the current CLoS, RMID and/or TDP configuration to verified applications and/or guests. Based on available guests/apps and/or orchestrator guidelines, the platform negotiates RDT profiles. In an embodiment, block 95 enforces the newly negotiated configuration and the method 90 terminates.

Figure 7:
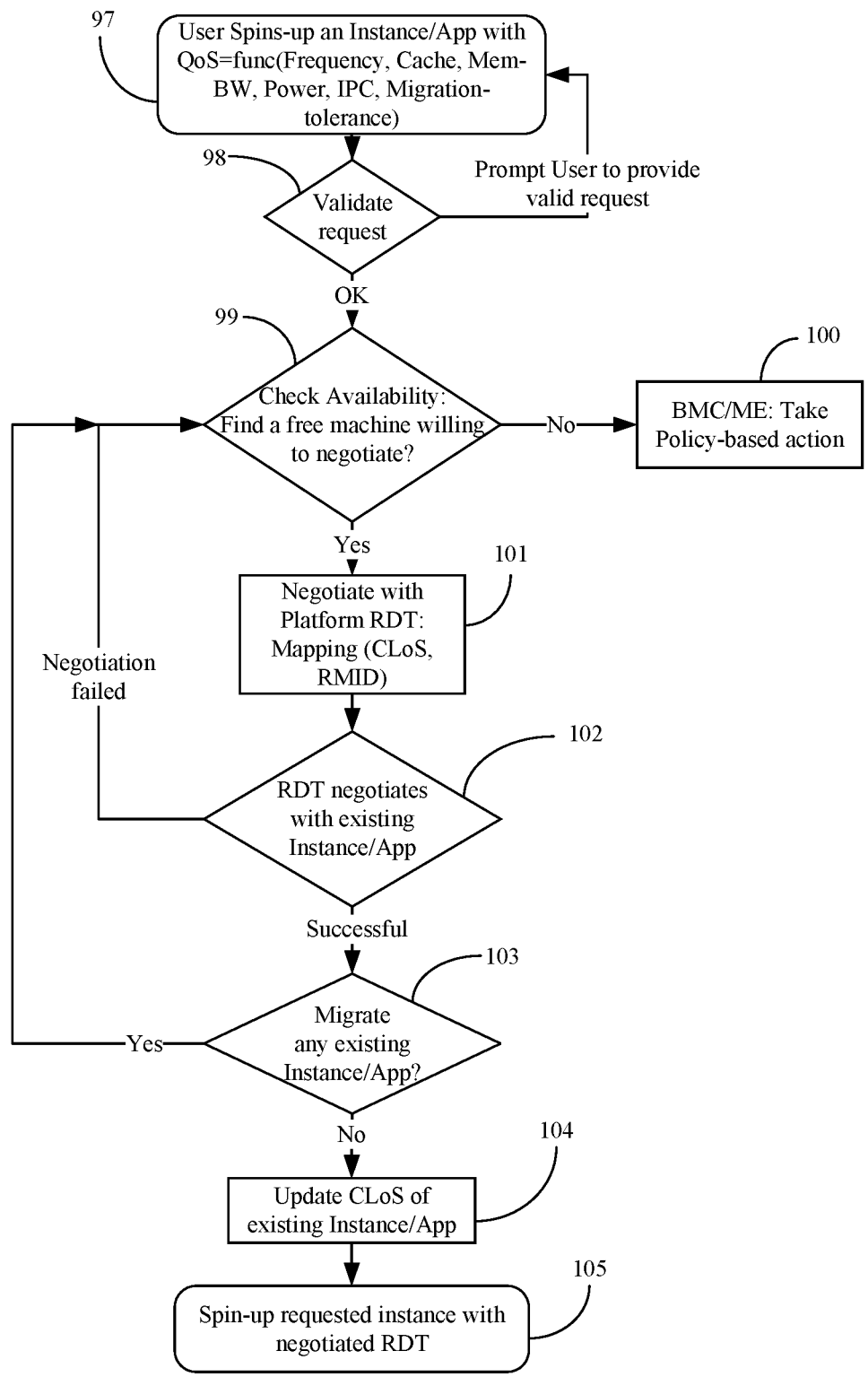
FIG. 7 is a flowchart of an example of method of negotiating RDT profile configurations and enforcing newly negotiated RDT profile configurations according to an embodiment.

FIG. 7 shows a method 96 of negotiating RDT profile configurations and enforcing newly negotiated RDT profile configurations. The method 96 may generally be incorporated into blocks 94 and/or 95 (FIG. 6), already discussed. More particularly, the method 96 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

A user may issue a request to spin-up an instance and/or application at block 97 with QoS=func(Frequency, Cache, Mem-BW, Power, IPC, Migration-tolerance), where the request is validated at block 98. If the request is invalid, the illustrated method 96 prompts the user for a valid request and returns to block 97. If the request is valid, block 99 performs an availability check (e.g., to find a free machine willing to negotiate). If no availability is detected at block 99, illustrated block 100 triggers a component such as a BMC and/or a manageability engine (ME) to take policy-based action. Otherwise, block 101 negotiates with the platform RDT (e.g., mapping CLoS and/or RMID). In block 102, the RDT negotiates with the existing instances/applications. If the negotiation fails, the method 96 returns to block 99. If the negotiation is successful, block 103 determines whether the proposed change involves a migration of an existing instance/application. If so, another node (e.g., Node N in FIG. 4B) is selected and the method 96 returns to block 99. If the proposed change does not involve a migration, block 104 updates the CLoS of the existing instance/application and block 105 spins-up the requested instance with the negotiated RDT.

Figure 8:
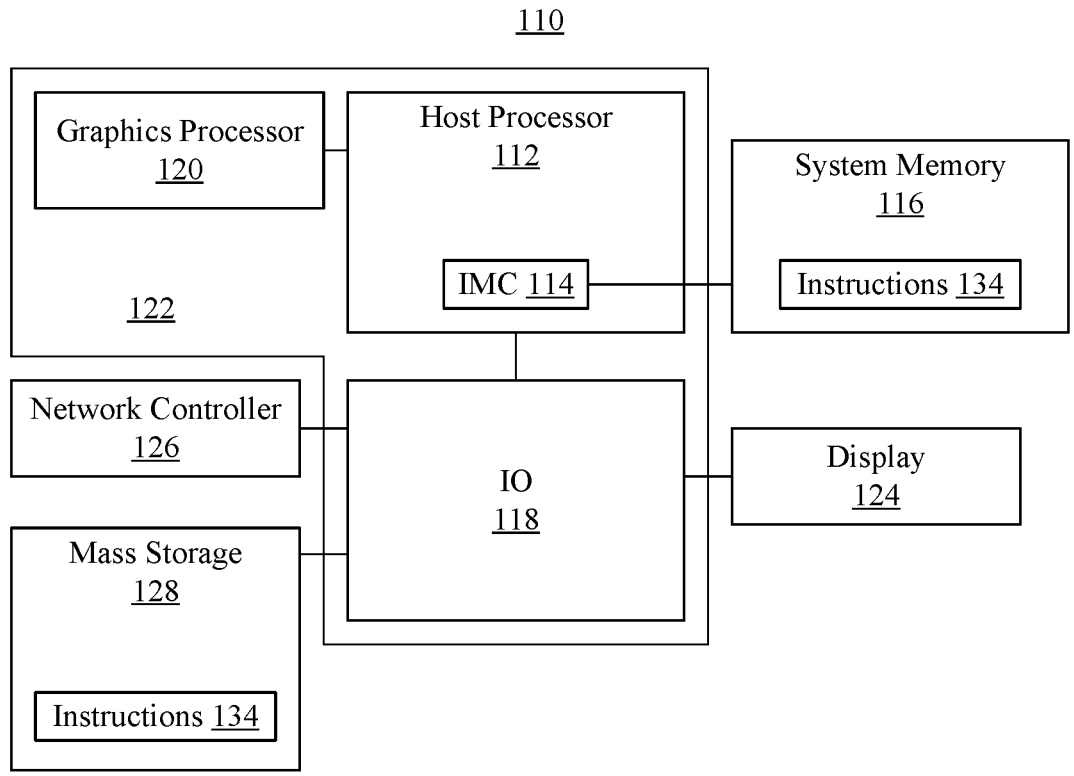
FIG. 8 is a block diagram of an example of a performance-enhanced computing system according to an embodiment.

Turning now to FIG. 8, a performance-enhanced computing system 110 is shown. The system 110 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, etc., or any combination thereof. In the illustrated example, the system 110 includes a host processor 112 (e.g., central processing unit/CPU) having an integrated memory controller (IMC) 114 that is coupled to a system memory 116.

The illustrated system 110 also includes an input output (IO) module 118 implemented together with the host processor 112 and a graphics processor 120 (e.g., GPU) on a semiconductor die 122 as a system on chip (SoC). The illustrated IO module 118 communicates with, for example, a display 124 (e.g., touch screen, liquid crystal display/LCD, light emitting diode/LED display), a network controller 126 (e.g., wired and/or wireless), and mass storage 128 (e.g., hard disk drive/HDD, optical disk, solid state drive/SSD, flash memory).

In an embodiment, the host processor 112, the graphics processor 120 and/or the IO module 118 execute program instructions 134 retrieved from the system memory 116 and/or the mass storage 128 to perform one or more aspects of the method 40 (FIG. 2), the method 60 (FIG. 3A), the method 70 (FIG. 3B), the method 90 (FIG. 6) and/or the method 96 (FIG. 7), already discussed. Thus, execution of the instructions 134 may cause the semiconductor die 122 and/or the computing system 110 to automatically determine a first proposed change to an existing resource allocation associated with a first application in a first node of the computing system 110, wherein the first proposed change is determined at least partially based on a requested resource allocation associated with a pending application and a first tolerance associated with the first application. Execution of the instructions 134 may also cause the semiconductor die 122 and/or the computing system 110 to issue the first proposed change to the first application and automatically conduct the first proposed change if the first application accepts the first proposed change.

The computing system 110 is therefore performance-enhanced at least to the extent that the system 110 uses application tolerances to dynamically adapt to incoming tenants that are unknown or have alternate resource requirements (e.g., SLAs) at runtime. The ability to automatically adjust existing resource allocations when tolerable by the corresponding application results in a more scalable architecture. Moreover, negotiating with existing applications as described further enhances flexibility, scalability and performance, particularly in dynamic conditions (e.g., changing power consumption conditions).

Figure 9:
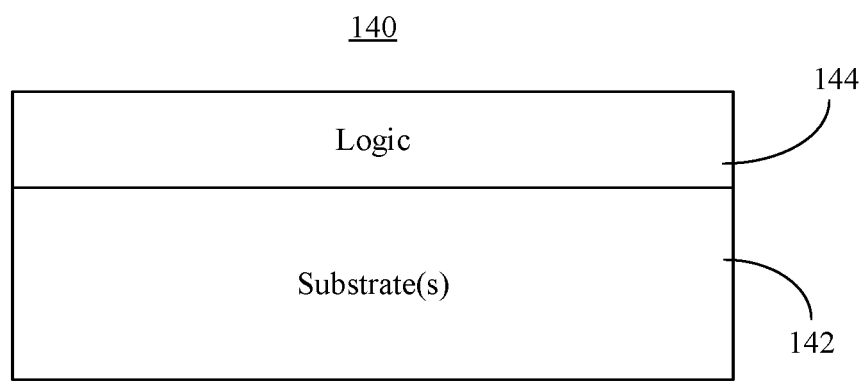
FIG. 9 is an illustration of an example of a semiconductor apparatus according to an embodiment.

FIG. 9 shows a semiconductor package apparatus 140. The illustrated apparatus 140 includes one or more substrates 142 (e.g., silicon, sapphire, gallium arsenide) and logic 144 (e.g., transistor array and other integrated circuit/IC components) coupled to the substrate(s) 142. The logic 144 may be implemented at least partly in configurable logic or fixed-functionality logic hardware. In one example, the logic 144 implements one or more aspects of the method 40 (FIG. 2), the method 60 (FIG. 3A), the method 70 (FIG. 3B), the method 90 (FIG. 6) and/or the method 96 (FIG. 7), already discussed. Thus, the logic 144 may automatically determine a first proposed change to an existing resource allocation associated with a first application in a first node, wherein the first proposed change is determined at least partially based on a requested resource allocation associated with a pending application and a first tolerance associated with the first application. The logic 144 may also issue the first proposed change to the first application and automatically conduct the first proposed change if the first application accepts the first proposed change.

The apparatus 140 is therefore performance-enhanced at least to the extent that the apparatus 140 uses application tolerances to dynamically adapt to incoming tenants that are unknown or have alternate resource requirements (e.g., SLAs) at runtime. The ability to automatically adjust existing resource allocations when tolerable by the corresponding application results in a more scalable architecture. Moreover, negotiating with existing applications as described further enhances flexibility, scalability and performance, particularly in dynamic conditions (e.g., changing power consumption conditions).

In one example, the logic 144 includes transistor channel regions that are positioned (e.g., embedded) within the substrate(s) 142. Thus, the interface between the logic 144 and the substrate(s) 142 may not be an abrupt junction. The logic 144 may also be considered to include an epitaxial layer that is grown on an initial wafer of the substrate(s) 142.

Figure 10:
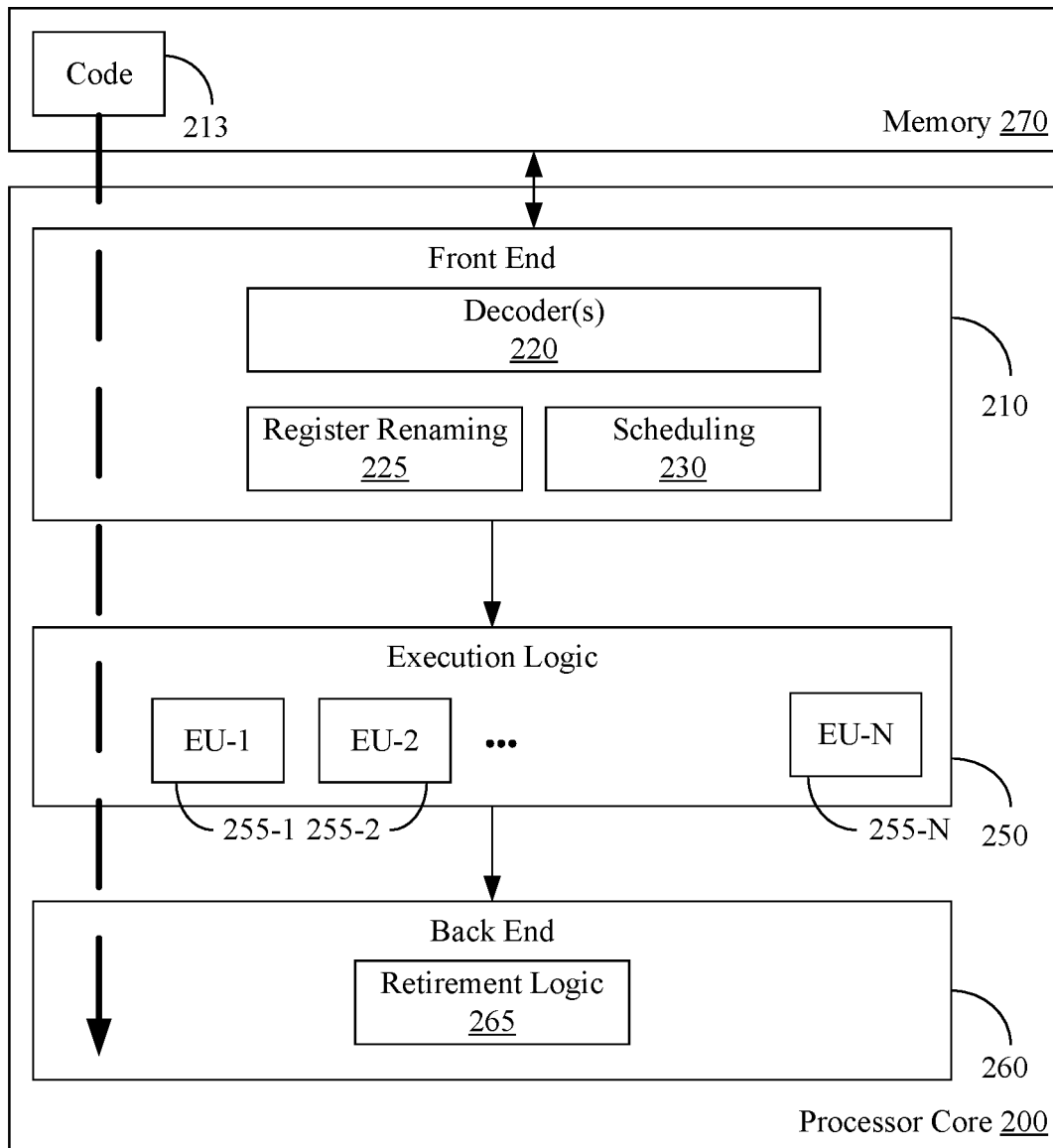
FIG. 10 is a block diagram of an example of a processor according to an embodiment.

FIG. 10 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 10, a processing element may alternatively include more than one of the processor core 200 illustrated in FIG. 10. The processor core 200 may be a single-threaded core or, for at least one embodiment, the processor core 200 may be multithreaded in that it may include more than one hardware thread context (or "logical processor") per core.

FIG. 10 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 40 (FIG. 2), the method 60 (FIG. 3A), the method 70 (FIG. 3B), the method 90 (FIG. 6) and/or the method 96 (FIG. 7), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 10, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 11:
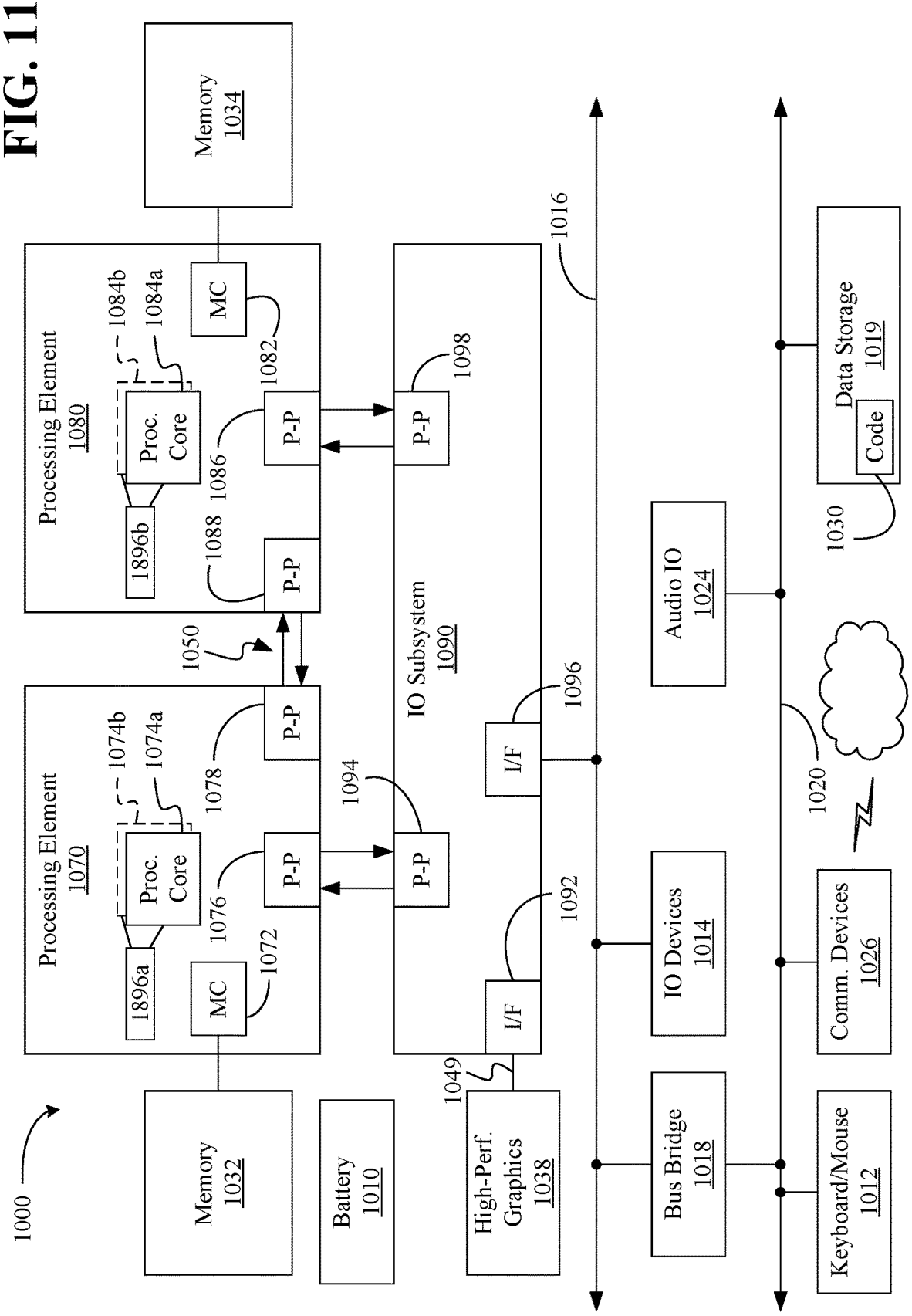
FIG. 11 is a block diagram of an example of a multi-processor based computing system according to an embodiment.

Referring now to FIG. 11, shown is a block diagram of a computing system 1000 embodiment in accordance with an embodiment. Shown in FIG. 11 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 11 may be implemented as a multi-drop bus rather than point-to-point interconnect.

As shown in FIG. 11, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 10.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 11, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 11, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI)

bus, or a bus such as a PCI Express bus or another third generation I/O interconnect bus, although the scope of the embodiments are not so limited.

As shown in FIG. 11, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement one or more aspects of the method 40 (FIG. 2), the method 60 (FIG. 3A), the method 70 (FIG. 3B), the method 90 (FIG. 6) and/or the method 96 (FIG. 7), already discussed. Further, an audio I/O 1024 may be coupled to second bus 1020 and a battery 1010 may supply power to the computing system 1000.

Note that other embodiments are contemplated. For example, instead of the point-to-point architecture of FIG. 11, a system may implement a multi-drop bus or another such communication topology. Also, the elements of FIG. 11 may alternatively be partitioned using more or fewer integrated chips than shown in FIG. 11.

ADDITIONAL NOTES AND EXAMPLES

Example 1 includes a performance-enhanced computing system comprising a network controller, a processor coupled to the network controller, and a memory coupled to the processor, the memory including a set of executable program instructions, which when executed by the processor, cause the processor to determine a first proposed change to an existing resource allocation associated with a first application in a first node of the computing system, wherein the first proposed change is to be determined at least partially based on a requested resource allocation associated with a pending application and a first tolerance associated with the first application, issue the first proposed change to the first application via a first bi-directional interface, and conduct the first proposed change if the first application accepts the first proposed change via the first bi-directional interface.

Example 2 includes the computing system of Example 1, wherein the first proposed change is to include a reduction to the existing resource allocation within a tolerable limit specified by the first application, and wherein the instructions, when executed, further cause the processor to conduct the requested resource allocation on the first node, and activate the pending application on the first node.

Example 3 includes the computing system of Example 1, wherein the first proposed change is to include a migration of the first application to a second node, and wherein the instructions, when executed, further cause the processor to determine a second proposed change to an existing resource allocation associated with a second application in the second node of the computing system, wherein the second proposed change is to be determined at least partially based on the existing resource allocation associated with the first application and a second tolerance associated with the second application, issue the second proposed change to the second application via a second bi-directional interface, and conduct the second proposed change if the second application accepts the second proposed change via the second bi-directional interface.

Example 4 includes the computing system of Example 1, wherein the instructions, when executed, further cause the processor receive a plurality of bids from a corresponding plurality of applications via the first bi-directional interface, conduct a comparison between the plurality of bids, and select the first application as a winning bidder based on the comparison.

Example 5 includes the computing system of Example 1, wherein the instructions, when executed, further cause the processor to determine whether one or more of the pending application or the first application are untrusted based on a programmable whitelist manifest, override the first proposed change if one or more of the pending application or the first application are determined to be untrusted, and take a configured policy-based action if one or more of the pending application or the first application are determined to be untrusted.

Example 6 includes the computing system of any one of Examples 1 to 5, wherein the instructions, when executed, further cause the processor to issue one or more additional proposed changes to one or more corresponding applications in the first node if the first application does not accept the first proposed change.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to determine a first proposed change to an existing resource allocation associated with a first application in a first node, wherein the first proposed change is to be determined at least partially based on a requested resource allocation associated with a pending application and a first tolerance associated with the first application, issue the first proposed change to the first application via a first bi-directional interface, and conduct the first proposed change if the first application accepts the first proposed change via the first bi-directional interface.

Example 8 includes the apparatus of Example 7, wherein the first proposed change is to include a reduction to the existing resource allocation within a tolerable limit specified by the first application, and wherein the logic coupled to the one or more substrates is to conduct the requested resource allocation on the first node, and activate the pending application on the first node.

Example 9 includes the apparatus of Example 7, wherein the first proposed change is to include a migration of the first application to a second node, and wherein the logic coupled to the one or more substrates is to determine a second proposed change to an existing resource allocation associated with a second application in the second node, wherein the second proposed change is to be determined at least partially based on the existing resource allocation associated with the first application and a second tolerance associated with the second application, issue the second proposed change to the second application via a second bi-directional interface, and conduct the second proposed change if the second application accepts the second proposed change via the second bi-directional interface.

Example 10 includes the apparatus of Example 7, wherein the logic coupled to the one or more substrates is to receive a plurality of bids from a corresponding plurality of applications via the first bi-directional interface, conduct a comparison between the plurality of bids, and select the first application as a winning bidder based on the comparison.

Example 11 includes the apparatus of Example 7, wherein the logic coupled to the one or more substrates is to determine whether one or more of the pending application or the first application are untrusted based on a programmable whitelist manifest, override the first proposed change if one or more of the pending application or the first application are determined to be untrusted, and take a configured policy-based action if one or more of the pending application or the first application are determined to be untrusted.

Example 12 includes the apparatus of any one of Examples 7 to 11, wherein the logic coupled to the one or more substrates is to issue one or more additional proposed changes to one or more corresponding applications in the first node if the first application does not accept the first proposed change.

Example 13 includes the apparatus of any one of Examples 7 to 12, wherein the logic coupled to the one or more substrates includes transistor channel regions that are positioned within the one or more substrates.

Example 14 includes at least one computer readable storage medium comprising a set of executable program instructions, which when executed by a computing system, cause the computing system to determine a first proposed change to an existing resource allocation associated with a first application in a first node, wherein the first proposed change is to be determined at least partially based on a requested resource allocation associated with a pending application and a first tolerance associated with the first application, issue the first proposed change to the first application via a first bi-directional interface, and conduct the first proposed change if the first application accepts the first proposed change via the first bi-directional interface.

Example 15 includes the at least one computer readable storage medium of Example 14, wherein the first proposed change is to include a reduction to the existing resource allocation within a tolerable limit specified by the first application, and wherein the instructions, when executed, further cause the computing system to conduct the requested resource allocation on the first node, and activate the pending application on the first node.

Example 16 includes the at least one computer readable storage medium of Example 14, wherein the first proposed change is to include a migration of the first application to a second node, and wherein the instructions, when executed, further cause the computing system to determine a second proposed change to an existing resource allocation associated with a second application in the second node, wherein the second proposed change is to be determined at least partially based on the existing resource allocation associated with the first application and a second tolerance associated with the second application, issue the second proposed change to the second application via a second bi-directional interface, and conduct the second proposed change if the second application accepts the second proposed change via the second bi-directional interface.

Example 17 includes the at least one computer readable storage medium of Example 14, wherein the instructions, when executed, further cause the computing system to receive a plurality of bids from a corresponding plurality of applications via the first bi-directional interface, conduct a comparison between the plurality of bids, and select the first application as a winning bidder based on the comparison.

Example 18 includes the at least one computer readable storage medium of Example 14, wherein the instructions, when executed, further cause the computing system to determine whether one or more of the pending application or the first application are untrusted based on a programmable whitelist manifest, override the first proposed change if one or more of the pending application or the first application are determined to be untrusted, and take a configured policy-based action if one or more of the pending application or the first application are determined to be untrusted.

Example 19 includes the at least one computer readable storage medium of any one of Examples 14 to 18, wherein the instructions, when executed, further cause the computing system to issue one or more additional proposed changes to one or more corresponding applications in the first node if the first application does not accept the first proposed change.

Example 20 includes a method of operating a performance-enhanced computing system, the method comprising determining a first proposed change to an existing resource allocation associated with a first application in a first node, wherein the first proposed change is determined at least partially based on a requested resource allocation associated with a pending application and a first tolerance associated with the first application, issuing the first proposed change to the first application via a first bi-directional interface, and conducting the first proposed change if the first application accepts the first proposed change via the first bi-directional interface.

Example 21 includes the method of Example 20, wherein the first proposed change includes a reduction to the existing resource allocation within a tolerable limit specified by the first application, and wherein the method further includes conducting the requested resource allocation on the first node, and activating the pending application on the first node.

Example 22 includes the method of Example 20, wherein the first proposed change includes a migration of the first application to a second node, the method further including determining a second proposed change to an existing resource allocation associated with a second application in the second node, wherein the second proposed change is determined at least partially based on the existing resource allocation associated with the first application and a second tolerance associated with the second application, issuing the second proposed change to the second application via a second bi-directional interface, and conducting the second proposed change if the second application accepts the second proposed change via the second bi-directional interface.

Example 23 includes the method of Example 20, further including receiving a plurality of bids from a corresponding plurality of applications via the first bi-directional interface, conducting a comparison between the plurality of bids, and selecting the first application as a winning bidder based on the comparison.

Example 24 includes the method of Example 20, further including determining whether one or more of the pending application or the first application are untrusted based on a programmable whitelist manifest, overriding the first proposed change if one or more of the pending application or the first application are determined to be untrusted, and take a configured policy-based action if one or more of the pending application or the first application are determined to be untrusted.

Example 25 includes the method of any one of Examples 20 to 24, further including issuing one or more additional proposed changes to one or more corresponding applications in the first node if the first application does not accept the first proposed change.

Example 26 includes means for performing the method of any one of Examples 20 to 25.

The technology described herein therefore enables applications to dynamically negotiate resource allocation based on tolerance factors prescribed by the applications. Such an approach helps achieve effective colocation and improved fleet-level utilization at the cluster level with acceptable/ guaranteed performance for all tenants, resulting in overall TCO benefits at the datacenter level. The technology makes system resource allocation scalable for hyperscale datacenters, where resource management occurs in a scale-up and scale-out manner. Further, the technology effectively handles tenants that requires alternate resource configurations at runtime (e.g., dynamically), which is prevalent in public cloud environments, resulting in higher fleet-level utilization.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/ or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
   a network controller;
   a processor coupled to the network controller; and
   a memory coupled to the processor, the memory including a set of executable program instructions, which when executed by the processor, cause the processor to:
      identify a request to activate a pending application with a requested resource allocation,
      determine, based on a first tolerance associated with a first application in a first node of the computing system, a first proposed change to a first existing resource allocation associated with the first application, wherein the first proposed change, if conducted, would make sufficient resources available in the first node to allow the requested resource allocation to be conducted,
      determine, based on a second tolerance associated with a second application in the first node, a second proposed change to a second existing resource allocation associated with the second application, wherein the second proposed change, if conducted, would make sufficient resources available in the first node to allow the requested resource allocation to be conducted, and wherein the second proposed change is different from the first proposed change,
      issue the first proposed change to the first application and the second proposed change to the second application via a first bi-directional interface,
      receive, via the first bi-directional interface, a first bid to accept the first proposed change from the first application and a second bid to accept the second proposed change from the second application,
      determine a winning bid from the first bid and the second bid, and
      conduct the first proposed change or the second proposed change to change the first existing resource allocation or the second existing resource allocation based on the winning bid and conduct the requested resource allocation on the first node.

2. The computing system of claim 1, wherein the first bid is the winning bid, the first proposed change includes a reduction to the existing resource allocation associated with the first application within a tolerable limit specified by the first application, and the instructions, when executed, further cause the processor to:
   activate the pending application on the first node.

3. The computing system of claim 1, wherein the first bid is the winning bid and the first proposed change includes a migration of the first application to a second node, and wherein the instructions, when executed, further cause the processor to:
   determine a third proposed change to an existing resource allocation associated with a third application in the second node of the computing system, wherein the third proposed change is to be determined at least partially based on the existing resource allocation associated with the first application and a third tolerance associated with the third application,
   issue the third proposed change to the third application via a second bi-directional interface, and conduct the third proposed change if the third application accepts the third proposed change via the second bi-directional interface.

4. The computing system of claim 1, wherein the first bid is the winning bid and the instructions, when executed, further cause the processor to:
 determine whether one or more of the pending application or the first application are untrusted based on a programmable whitelist manifest, and
 if one or more of the pending application or the first application are determined to be untrusted, override the first proposed change and take a configured policy-based action.

5. A semiconductor apparatus comprising:
 one or more substrates; and
 logic coupled to the one or more substrates, wherein the logic is implemented at least partly in one or more of configurable logic or fixed-functionality logic hardware, the logic coupled to the one or more substrates to:
  identify a request to activate a pending application with a requested resource allocation,
  determine, based on a first tolerance associated with a first application in a first node, a first proposed change to a first existing resource allocation associated with the first application, wherein the first proposed change, if conducted, would make sufficient resources available in the first node to allow the requested resource allocation to be conducted,
  determine, based on a second tolerance associated with a second application in the first node, a second proposed change to a second existing resource allocation associated with the second application, wherein the second proposed change, if conducted, would make sufficient resources available in the first node to allow the requested resource allocation to be conducted, and wherein the second proposed change is different from the first proposed change,
  issue the first proposed change to the first application and the second proposed change to the second application via a first bi-directional interface,
  receive, via the first bi-directional interface, a first bid to accept the first proposed change from the first application and a second bid to accept the second proposed change from the second application,
  determine a winning bid from the first bid and the second bid, and
  conduct the first proposed change or the second proposed change to change the first existing resource allocation or the second existing resource allocation based on the winning bid and conduct the requested resource allocation on the first node.

6. The apparatus of claim 5, wherein the first bid is the winning bid, the first proposed change includes a reduction to the existing resource allocation associated with the first application within a tolerable limit specified by the first application, and the logic coupled to the one or more substrates is to:
 activate the pending application on the first node.

7. The apparatus of claim 5, wherein the first bid is the winning bid and the first proposed change includes a migration of the first application to a second node, and wherein the logic coupled to the one or more substrates is to:
 determine a third proposed change to an existing resource allocation associated with a third application in the second node of the computing system, wherein the third proposed change is to be determined at least partially based on the existing resource allocation associated with the first application and a third tolerance associated with the third application,
 issue the third proposed change to the third application via a second bi-directional interface, and
 conduct the third proposed change if the third application accepts the third proposed change via the second bi-directional interface.

8. The apparatus of claim 5, wherein the first bid is the winning bid and the logic coupled to the one or more substrates is to:
 determine whether one or more of the pending application or the first application are untrusted based on a programmable whitelist manifest, and
 if one or more of the pending application or the first application are determined to be untrusted, override the first proposed change and take a configured policy-based action.

9. The apparatus of claim 5, wherein the logic coupled to the one or more substrates includes transistor channel regions that are positioned within the one or more substrates.

10. At least one non-transitory computer readable storage medium comprising a set of executable program instructions, which when executed by a computing system, cause the computing system to:
 identify a request to activate a pending application with a requested resource allocation,
 determine, based on a first tolerance associated with a first application in a first node, a first proposed change to a first existing resource allocation associated with the first application, wherein the first proposed change, if conducted, would make sufficient resources available in the first node to allow the requested resource allocation to be conducted,
 determine, based on a second tolerance associated with a second application in the first node, a second proposed change to a second existing resource allocation associated with the second application, wherein the second proposed change, if conducted, would make sufficient resources available in the first node to allow the requested resource allocation to be conducted, and wherein the second proposed change is different from the first proposed change,
 issue the first proposed change to the first application and the second proposed change to the second application via a first bi-directional interface,
 receive, via the first bi-directional interface, a first bid to accept the first proposed change from the first application and a second bid to accept the second proposed change from the second application,
 determine a winning bid from the first bid and the second bid, and
 conduct the first proposed change or the second proposed change to change the first existing resource allocation or the second existing resource allocation based on the winning bid and conduct the requested resource allocation on the first node.

11. The at least one non-transitory computer readable storage medium of claim 10, wherein the first bid is the winning bid, the first proposed change includes a reduction to the existing resource allocation associated with the first application within a tolerable limit specified by the first application, and the instructions, when executed, further cause the computing system to:
 activate the pending application on the first node.

12. The at least one non-transitory computer readable storage medium of claim 10, wherein the first bid is the winning bid and the first proposed change includes a migration of the first application to a second node, and wherein the instructions, when executed, further cause the computing system to:

determine a third proposed change to an existing resource allocation associated with a third application in the second node of the computing system, wherein the third proposed change is to be determined at least partially based on the existing resource allocation associated with the first application and a third tolerance associated with the third application, issue the third proposed change to the third application via a second bi-directional interface, and conduct the third proposed change if the third application accepts the third proposed change via the second bi-directional interface.

13. The at least one non-transitory computer readable storage medium of claim 10, wherein the first bid is the winning bid and the instructions, when executed, further cause the computing system to:

determine whether one or more of the pending application or the first application are untrusted based on a programmable whitelist manifest, and if one or more of the pending application or the first application are determined to be untrusted, override the instructions to conduct the change to resource allocations and take a configured policy-based action.

14. A method comprising:

identifying a request to activate a pending application with a requested resource allocation, determining, based on a first tolerance associated with a first application in a first node, a first proposed change to a first existing resource allocation associated with the first application, wherein the first proposed change, if conducted, would make sufficient resources available in the first node to allow the requested resource allocation to be conducted;

determining, based on a second tolerance associated with a second application in the first node, a second proposed change to a second existing resource allocation associated with the second application, wherein the second proposed change, if conducted, would make sufficient resources available in the first node to allow the requested resource allocation to be conducted, and wherein the second proposed change is different from the first proposed change;

issuing the first proposed change to the first application and the second proposed change to the second application via a first bi-directional interface;

receiving, via the first bi-directional interface, a first bid to accept the first proposed change from the first application and a second bid to accept the second proposed change from the second application, determining a winning bid from the first bid and the second bid; and conducting the first proposed change or the second proposed change to change the first existing resource allocation or the second existing resource allocation based on the winning bid and conducting the requested resource allocation on the first node.

15. The method of claim 14, wherein the first bid is the winning bid, the first proposed change includes a reduction to the existing resource allocation associated with the first application within a tolerable limit specified by the first application, and the method further includes:

activating the pending application on the first node.

16. The method of claim 14, wherein the first bid is the winning bid and the first proposed change includes a migration of the first application to a second node, the method further including:

determining a third proposed change to an existing resource allocation associated with a third application in the second node of the computing system, wherein the third proposed change is to be determined at least partially based on the existing resource allocation associated with the first application and a third tolerance associated with the third application, issuing the third proposed change to the third application via a second bi-directional interface, and conducting the third proposed change if the third application accepts the third proposed change via the second bi-directional interface.

17. The method of claim 14, wherein the first bid is the winning bid and the method further including:

determining whether one or more of the pending application or the first application are untrusted based on a programmable whitelist manifest; and if one or more of the pending application or the first application are determined to be untrusted, overriding the first proposed change and take a configured policy-based action.

* * * * *